United States Patent
Yoda

(10) Patent No.: US 7,929,023 B2
(45) Date of Patent: Apr. 19, 2011

(54) CAMERA DEVICE AND MONITORING SYSTEM

(75) Inventor: Koji Yoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1088 days.

(21) Appl. No.: 11/710,756

(22) Filed: Feb. 26, 2007

(65) Prior Publication Data

US 2007/0200937 A1    Aug. 30, 2007

(30) Foreign Application Priority Data

Feb. 27, 2006   (JP) ................. P2006-050396

(51) Int. Cl.
*H04N 5/225* (2006.01)
*G02B 13/16* (2006.01)

(52) U.S. Cl. .................. 348/222.1; 348/335; 382/293
(58) Field of Classification Search .............. 359/662; 382/215, 293; 329/317

See application file for complete search history.

(56) References Cited

U.S. PATENT DOCUMENTS

| | | | | |
|---|---|---|---|---|
| 5,313,306 A | * | 5/1994 | Kuban et al. .......... | 348/65 |
| 5,937,105 A | * | 8/1999 | Katayama et al. ...... | 382/293 |
| 6,201,574 B1 | * | 3/2001 | Martin .................. | 348/315 |
| 6,795,113 B1 | * | 9/2004 | Jackson et al. ......... | 348/207.1 |
| 7,457,478 B2 | * | 11/2008 | Aoyama et al. ........ | 382/275 |
| 7,676,115 B2 | * | 3/2010 | Komagamine ......... | 382/293 |
| 2004/0179100 A1 | * | 9/2004 | Ueyama ................ | 348/152 |

FOREIGN PATENT DOCUMENTS

| | | |
|---|---|---|
| JP | 06-295205 | 10/1994 |
| JP | 07-093558 | 4/1995 |
| JP | 10-291188 | 11/1998 |
| JP | 2000-222097 | 8/2000 |
| JP | 2005-057605 | 3/2005 |

* cited by examiner

*Primary Examiner* — David L Ometz
*Assistant Examiner* — Dwight Alex C Tejano
(74) *Attorney, Agent, or Firm* — Rader, Fishman & Grauer PLLC

(57) ABSTRACT

In a camera device having a function for converting an image formed by a lens and captured by an imaging element into image data and correcting distortion of the image data caused by distortion aberration of the lens, the camera device includes a first storage unit for storing first distortion correction parameters for correcting the distortion of the image data in a first state, a second storage unit for storing second distortion correction parameters for correcting the distortion of the image data in a second state, and a distortion-correction-parameter interpolator for generating distortion correction parameters through interpolation when transition of the image data from the first state to the second state is performed. The distortion correction parameters indicate states of the image data during the transition of the image data and correct the distortion of the image data caused by the distortion aberration of the lens.

11 Claims, 15 Drawing Sheets

PORTIONS TO WHICH DISTORTION CORRECTION HAS BEEN APPLIED

IMAGE PROJECTED THROUGH SUPER-WIDE-ANGLE LENS, INDICATED BY CIRCLE

EXAMPLE OF PANNING AND TILTING

EXAMPLE OF NARROW ANGLE

EXAMPLE OF WIDE ANGLE

EXAMPLE OF ROTATION

EXAMPLE OF HORIZONTAL INVERSION

*) DISTORTION IS IGNORED IN EACH OF PIECES FOR SIMPLICITY

CAMERA DEVICE AND MONITORING SYSTEM

CROSS REFERENCES TO RELATED APPLICATIONS

The present invention contains subject matter related to Japanese Patent Application JP 2006-050396 filed in the Japanese Patent Office on Feb. 27, 2006, the entire contents of which are incorporated herein by reference.

BACKGROUND OF THE INVENTION

1. Field of the Invention

The present invention relates to industrial television (ITV) cameras for monitoring systems, and more particularly to distortion correction image processing for images captured by an ITV camera in which the direction of a lens is fixed and the lens is a super-wide-angle lens.

2. Description of the Related Art

A monitoring system for correcting distortion of images captured in super wide angle and compositing the images is generally known. In the general configuration of the monitoring system, an image before distortion correction captured by an ITV camera having a super-wide-angle lens is transmitted to a host computer by an arbitrary transmitter. The host computer captures the image and performs image processing such as distortion correction, cutout processing, and compositing by means of software to display the image on a display device (refer to Japanese Unexamined Publication Application No. 7-93558).

SUMMARY OF THE INVENTION

In the above-described monitoring system in the related art, however, since an inexpensive host computer with low performance takes a significant amount of time to perform the image processing such as distortion correction, cutout processing, or compositing, the image processing is not terminated within one frame, resulting in deterioration of real-time processing. To ensure real-time processing, an expensive host computer with high performance can be used. In this case, however, system cost is increased.

When an image before distortion correction captured in super wide angle by a known camera is transmitted to a host computer, the image output from the known camera has been subjected to camera-signal processing prior to the transmission. The image has a low dynamic range due to gamma processing, for example. Furthermore, since the total number of pixels of an imaging sensor mounted on the camera, the total number of pixels of a source image, and the total number of pixels of an image output from the camera are generally the same, a peripheral area of the image output from the camera has a low resolution due to distortion aberration characteristics of the lens. Accordingly, when an analog transmitter (such as national television system committee (NTSC)) is used, the source image which is to be processed by the host computer is deteriorated by the time the host computer obtains the source image due to an adverse effect of transmission noise. Therefore, even when the distortion of the deteriorated source image is corrected in the host computer, a high-quality image is not obtained.

A well-known method of correcting distortion of an image captured in super wide angle is a method using an algorithm in which lens distortion aberration is arranged in a lattice form by utilizing an image before distortion correction to obtain a vector quantity as a distortion correction parameter, whereby the distortion is corrected. After arbitrary portions are cut out from the source image in accordance with the algorithm, when panning, tilting, zooming, or rotating of portions other than the cutout portions are intended to be performed so as to be seen such that the direction of a lens is smoothly changed, distortion correction parameters for the cutout portions of the source image is necessary to be obtained in advance.

In this case, when the cutout portions have large intervals therebetween, images are discontinuously shown on a display at a time of panning, tilting, zooming, or rotating. On the other hand, when the cutout portions have small intervals therebetween, images are comparatively successively shown on a display at a time of panning, tilting, zooming, or rotating. However, since the display of successive images should have many distortion correction parameters to be stored in a storage device, the capacity of the storage device should be increased, resulting in an increase in system cost.

To address these drawbacks, if a host computer generates the distortion correction parameters by performing calculation processing as needed instead of storing the distortion correction parameters in the storage device in advance, an increase in the capacity of the storage device is not necessary, resulting in smooth display of the images at the time of panning, tilting, zooming or rotating. However, if the host computer takes an excessive amount of time for calculation of the distortion correction parameters, the images are discontinuously shown on a display. Accordingly, an expensive host computer with high performance is necessary for reducing the calculation time. However, this leads to an increase in system cost.

As a known technique for entry phones having a camera and wide-view camera devices, distortion of an image captured in super wide angle is corrected in the camera. However, since arbitrary distortion correction parameters are not rewritable in these devices, flexible correction is not attained. In addition, since a current distortion correction parameter is not used as a parameter for interpolation of another distortion correction parameter, the camera does not perform smooth panning, tilting, and the like. Therefore, a dome camera (a camera in which the direction of a lens can be changed by mechanically driving the lens) used in a system is not replaceable by the above-described camera capable of correcting the distortion in the camera.

Accordingly, it is desirable to provide a camera device in which the direction of a lens thereof is fixed and which is capable of smoothly displaying an image at the time of panning, tilting, zooming, or rotating and to provide a monitoring system utilizing the camera device without increasing the cost of the camera device or the system.

According to an embodiment of the present invention, in a camera device having a function for converting an image formed by a lens and captured by an imaging element into image data and correcting distortion of the image data caused by distortion aberration of the lens, the camera device includes first storage means for storing first distortion correction parameters for correcting the distortion of the image data in a first state caused by the distortion aberration of the lens, second storage means for storing second distortion correction parameters for correcting the distortion of the image data in a second state caused by the distortion aberration of the lens, and distortion-correction-parameter interpolation means for generating distortion correction parameters through interpolation when transition of the image data from the first state to the second state is performed. The distortion correction parameters indicate states of the image data during the transition of the image data and correct the distortion of the image data caused by the distortion aberration of the lens.

The total number of pixels receiving light of the imaging element may be larger than the total number of pixels of an image output from the camera device after the distortion correction.

According to the embodiment of the present invention, in a monitoring system for transmitting an image captured by one or more monitoring cameras having a super-wide-angle lens through a transmission line to a host computer, the monitoring system includes distortion correction means for correcting distortion of image data caused by distortion aberration of the lens, the image data being obtained by being formed by the super-wide-angle lens and being captured by an imaging element, the distortion correction means being included in the one or more monitoring cameras. The distortion correction means including first storage means for storing first distortion correction parameters for correcting the distortion of the image data in a first state caused by the distortion aberration of the lens, second storage means for storing second distortion correction parameters for correcting the distortion of the image data in a second state caused by the distortion aberration of the lens, and distortion-correction-parameter interpolation means for generating distortion correction parameters through interpolation when transition of the image data from the first state to the second state is performed. The distortion correction parameters indicate states of the image data during the transition of the image data and correct the distortion of the image data caused by the distortion aberration of the lens.

Since a camera device performs distortion correction for an image captured by the super-wide-angle lens, for example, the host computer to which the camera device is connected through a line, for example, merely have standard performance. A controller of the camera device merely indicates distortion correction parameters for a source image and distortion correction parameters for a final image to be obtained. Inexpensive distortion-correction-parameter interpolation means generates other necessary distortion correction parameters to perform distortion correction on an image. Accordingly, the cost of the monitoring system is not increased and smooth display of the image is achieved at the time of panning, tilting, zooming or rotating.

Furthermore, since the total number of pixels receiving light of the imaging element is larger, for example five to six times larger, than the total number of pixels of an image which is output from the camera device and to which the distortion correction has been applied, deterioration of an image after the distortion correction can be suppressed and the image having excellent quality can be obtained.

According to the embodiment of the present invention, since a camera device performs distortion correction for an image captured by the super-wide-angle lens, the host computer to which the camera device is connected through a line, for example, merely have standard performance. Accordingly, use of such a host computer does not lead to an excessive increase in the cost of the monitoring system. In the camera device, the controller (a microcomputer) merely indicates distortion correction parameters for a source image and distortion correction parameters for a final image to be obtained. The other necessary distortion correction parameters are generated by interpolation to thereby perform distortion correction on an image. Accordingly, smooth display of the image is achieved at the time of panning, tilting, zooming or rotating. Since the controller does not have many distortion correction parameters, a large-capacity storage apparatus or a high-performance central processing unit (CPU) is not necessary. Accordingly, use of such a camera device does not lead to an increase in the cost of the monitoring system. Furthermore, since the distortion-correction-parameter interpolation means may be constituted by inexpensive hardware, use of such distortion-correction-parameter interpolation means does not lead to an increase in the cost of the monitoring system. Accordingly, smooth operations such as panning, tilting, zooming, and rotating can be achieved with an inexpensive monitoring system. Since the advantages described above are obtained, a dome camera device (a camera in which the direction of a lens thereof is changed by mechanically driving the lens) used in the monitoring system is replaceable by a camera device in which the direction of a lens thereof is fixed. Furthermore, since the total number of pixels receiving light of the imaging element is larger, for example five to six times larger, than the total number of pixels of an image which is output from the camera device and to which the distortion correction has been applied, deterioration of an image after the distortion correction can be suppressed and the image having excellent quality can be obtained.

DESCRIPTION OF THE PREFERRED EMBODIMENTS

Embodiments of the present invention will be described in detail hereinafter with reference to the accompanying drawings.

Figure 1:
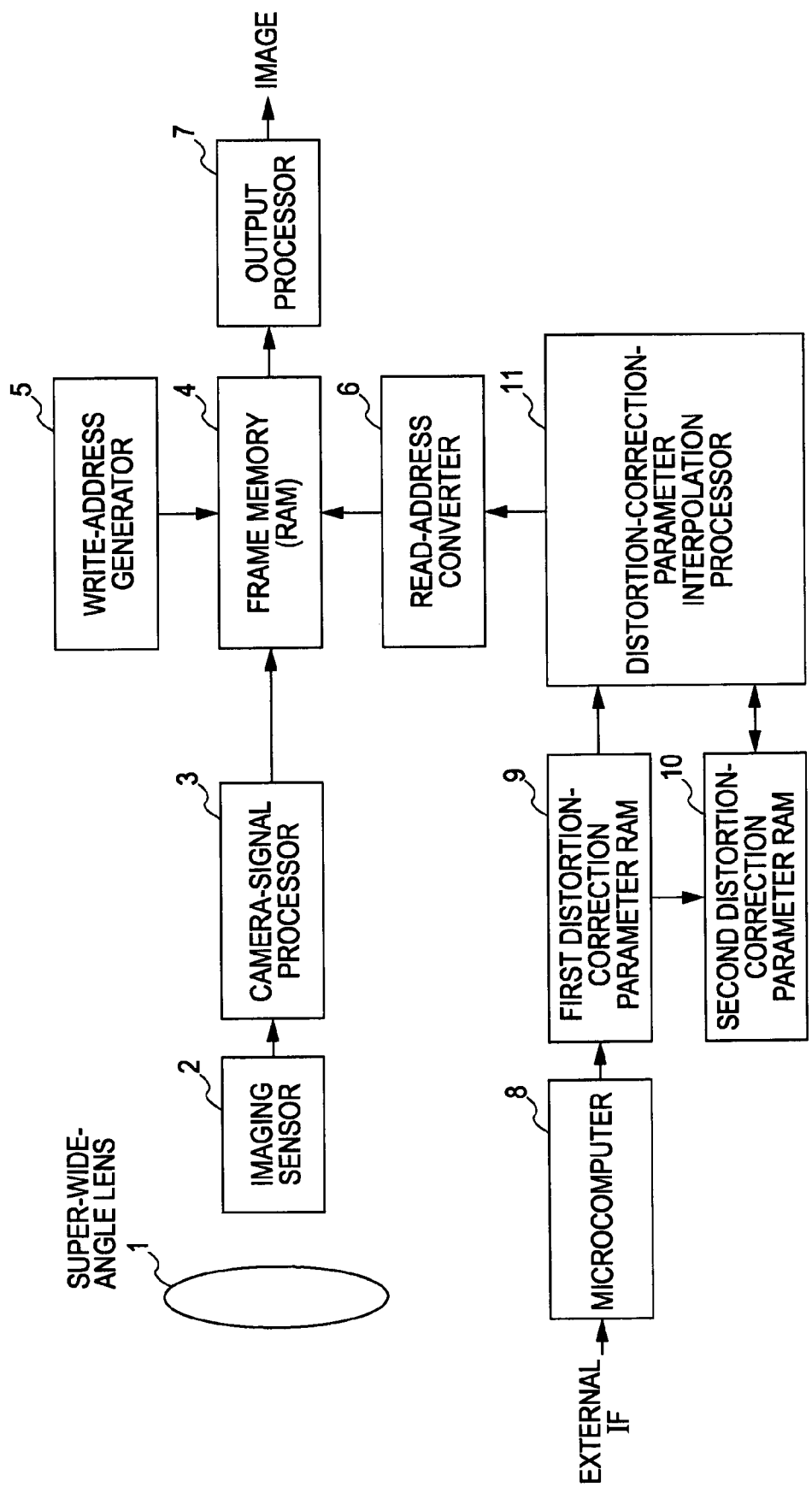
FIG. 1 is a block diagram illustrating a camera device which captures images in super wide angle and which is used for a monitoring system according to an embodiment of the present invention.

FIG. 1 is a block diagram illustrating a configuration of a camera device according to an embodiment of the present invention, which captures images in super wide angle and which is used for a monitoring system. The super-wide-angle-imaging camera device includes a super-wide-angle lens 1, an imaging sensor 2, a camera-signal processor 3, a frame memory (RAM) 4, a write-address generator 5, a read-address converter 6, an output processor 7, a microcomputer 8, a first distortion-correction parameter RAM 9, a second distortion-correction parameter RAM 10, and a distortion-correction-parameter interpolation processor 11. Note that the microcomputer 8 is connected to, for example, a host computer (not shown) using an external interface (IF) through a transmission line and the microcomputer 8 is included in a monitoring system. In this case, the camera device is called a monitoring camera.

An operation of the camera device of the embodiment will now be described. The super-wide-angle imaging camera performs cutout processing (panning, tilting, and zooming), rotation, inversion processing, and compositing on an image while the image captured in super wide angle is subjected to distortion correction by utilizing distortion correction parameters. Here, the microcomputer 8 may store the distortion correction parameters in a memory such as a read-only memory (ROM) or a random access memory (RAM) incorporated in the camera device. Alternatively, the microcomputer 8 may obtain the distortion correction parameters by calculation or may receive the distortion correction parameters from the host computer (not shown) which is connected to the camera device through the transmission line as an external communication.

Figure 2:
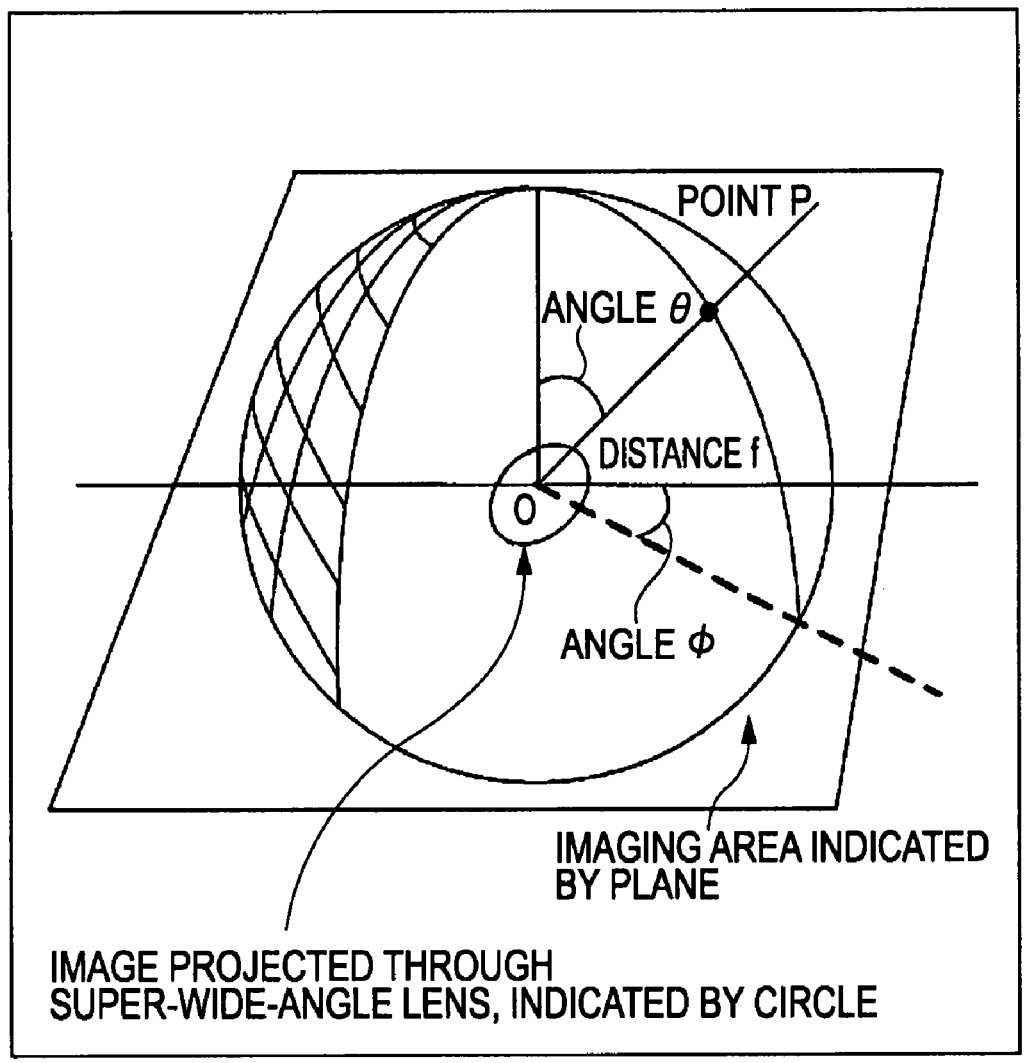
FIG. 2 is a diagram illustrating a concept of super-wide-angle imaging.

The super-wide-angle lens 1 is used to capture an image of a subject. FIG. 2 shows a concept of imaging using the super-wide-angle lens 1. Distortion correction parameters are calculated such that, as shown in FIG. 2, a lattice showing distortion aberration of the super-wide-angle lens 1 is projected on an imaging area (plane) whereby vectors (X, Y) for lattice points are obtained so that the lattice showing distortion aberration of the super-wide-angle lens 1 matches a square lattice on the imaging area.

Figure 3:
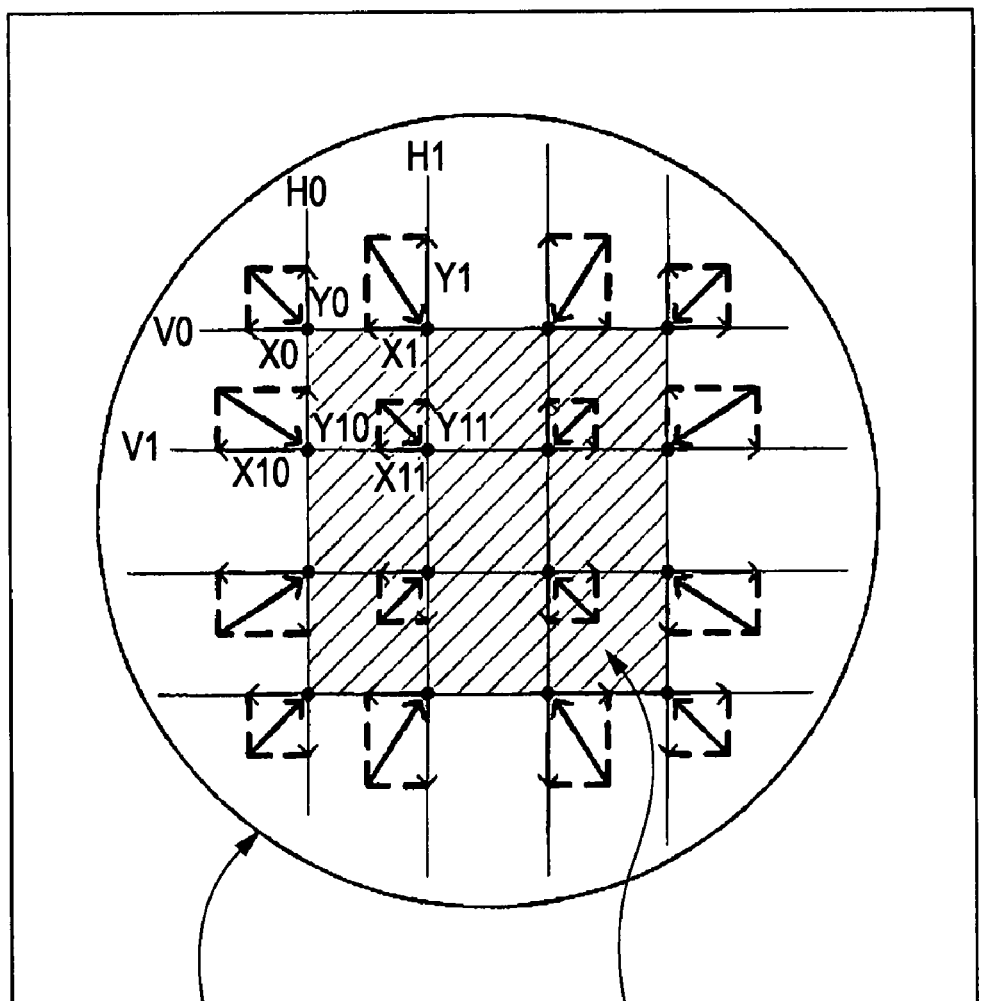
FIG. 3 is a diagram illustrating an example of distortion correction for an image captured using a super-wide angle lens.
Figure 4:
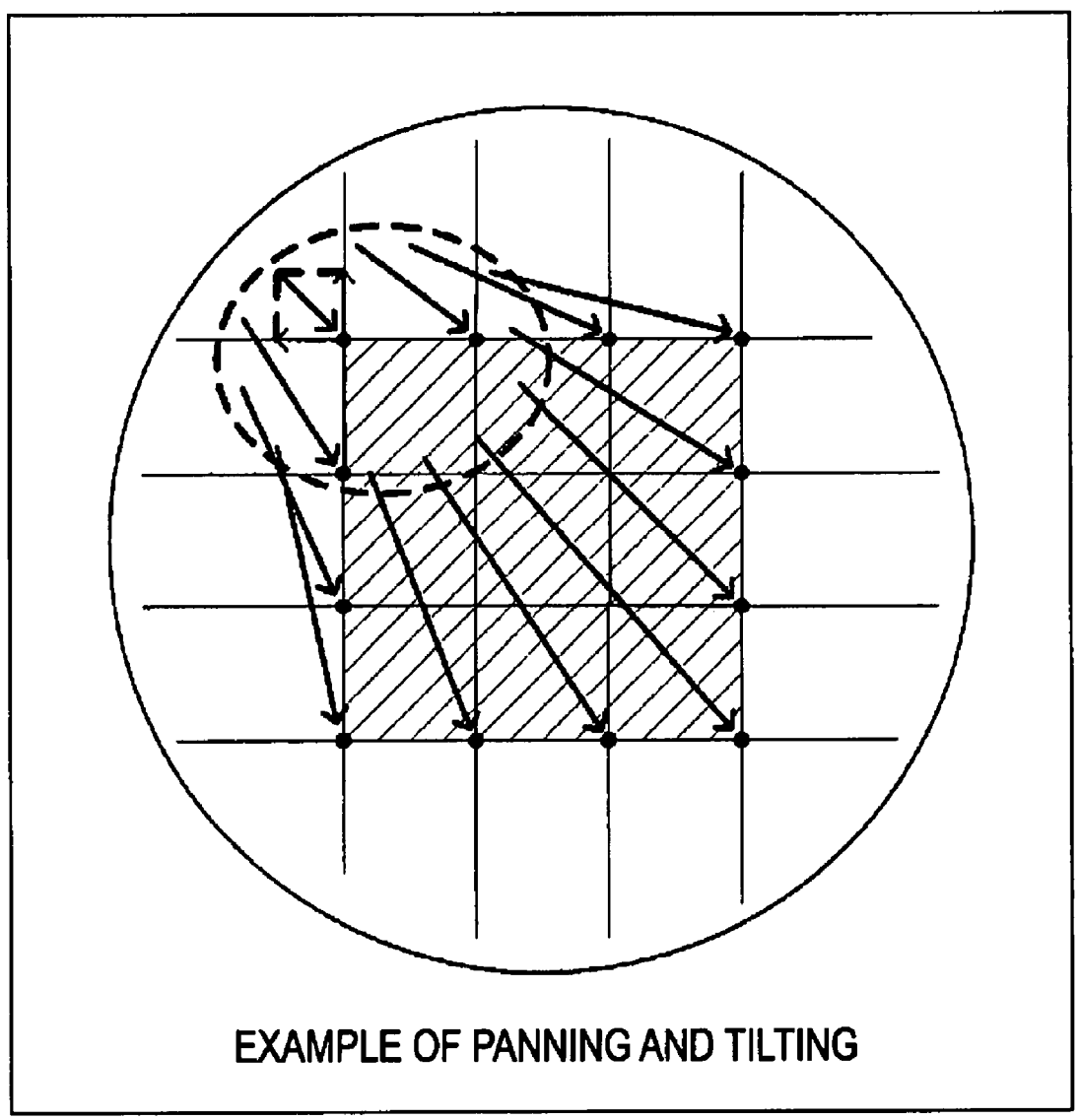
FIG. 4 is a diagram illustrating an example of panning and tilting.

Accordingly, as shown in FIG. 3, the distortion correction parameters denote lattice points of an output image by using vectors (X, Y) indicating the lattice points of a source image to which distortion correction has not yet been applied. A field angle (magnification of a lens) can be changed in accordance with a distance f of a normal line OP shown in FIG. 2 and a cutout portion can be changed (by panning, tilting, and rotating) in accordance with a zenith angle θ and an azimuth angle φ. Furthermore, spaces between the lattice points are interpolated using vectors of lattice points in the vicinity of the lattice points of interest. In this case, a nearest neighbor method, a bilinear method, or a bicubic method may be used as an algorithm for the interpolation.

The super-wide-angle lens 1 forms an optical image of the subject on a light receiving surface of the imaging sensor 2 and the imaging sensor 2 photoelectrically converts the optical image into RAW data. Then, image data captured as described above is input to the frame memory 4 through the camera-signal processor 3 and distortion due to the distortion aberration of the super-wide-angle lens 1 is corrected in the frame memory 4. Thus, an image in an appropriate state (which has been subjected to auto exposure (AE) and auto white balance (AWB)) is output to the host computer from the output processor 7 as an image which has no distortion. In this embodiment, each of the total number of pixels of the imaging sensor 2 and the total number of pixels of a source image input to the camera-signal processor 3 is several times larger than the total number of pixels of the image output from the output processor 7. Accordingly, deterioration of resolution of a peripheral area due to the distortion aberration of the lens 1 can be suppressed. Such source images are successively stored in the frame memory 4 in accordance with addresses specified by the write-address generator 5.

The microcomputer 8 controls the first RAM 9 to store the distortion correction parameters which indicate a portion of the source image which is to be subjected to the distortion correction. Meanwhile, the second RAM 10 stores distortion correction parameters which are currently used for the distortion correction. After transition of the distortion correction parameters in the second RAM 10 (smoothly panning, tilting, zooming, or rotating) to the distortion correction parameters in the first RAM 9, the distortion correction parameters in the first RAM 9 are transferred to the second RAM 10. When the transition of the distortion correction parameters in the second RAM 10 to the distortion correction parameters in the first RAM 9 is performed, the distortion-correction-parameter interpolation processor 11 corrects vectors (X, Y) between the lattice points for distortion correction parameters formed in a lattice manner as shown in FIG. 2, and corrects the vectors (X, Y) at the lattice points in the course of the transition from the distortion correction parameters in the second RAM 10 to the distortion correction parameters in the first RAM 9 at the time of smooth panning, tilting, zooming, or rotating. Such correction vectors (distortion correction parameters) are sequentially generated by the distortion-correction-parameter interpolation processor 11.

The read-address converter 6 converts the vectors (X, Y) of the distortion correction parameters successively generated by the distortion-correction-parameter interpolation processor 11 into actual addresses and supplies the actual addresses to the frame memory 4. The frame memory 4 performs smooth distortion correction on portions to be corrected in the source image using the distortion correction parameters which are continuously changed. The data read out from the frame memory 4 is obtained by subjecting an image to the distortion correction, cutout processing, and compositing and the data is further subjected to gamma processing, mask processing, and format conversion in the output processor 7 before outputting externally.

The way in which the distortion correction parameters are obtained will now be described. Note that the distortion correction parameters may be stored in a memory such as a ROM or a RAM of the microcomputer 8, may be obtained by calculation, or may be received from the host computer as external communication.

(1-1) Cutting of Portions from Source Image (Panning/Tilting)

When an arbitrary portion is cut out (panning or tilting) from the source image, in the arbitrary portion of the source image, distortion correction parameters are obtained by adding offsets (X, Y) of lattice points of an output image to vectors (X, Y) of lattice points indicating the distortion aberration of the lens.

(1-2) Field Angle Change (Zoom) of Piece Cut Out from Source Image

Figure 5:
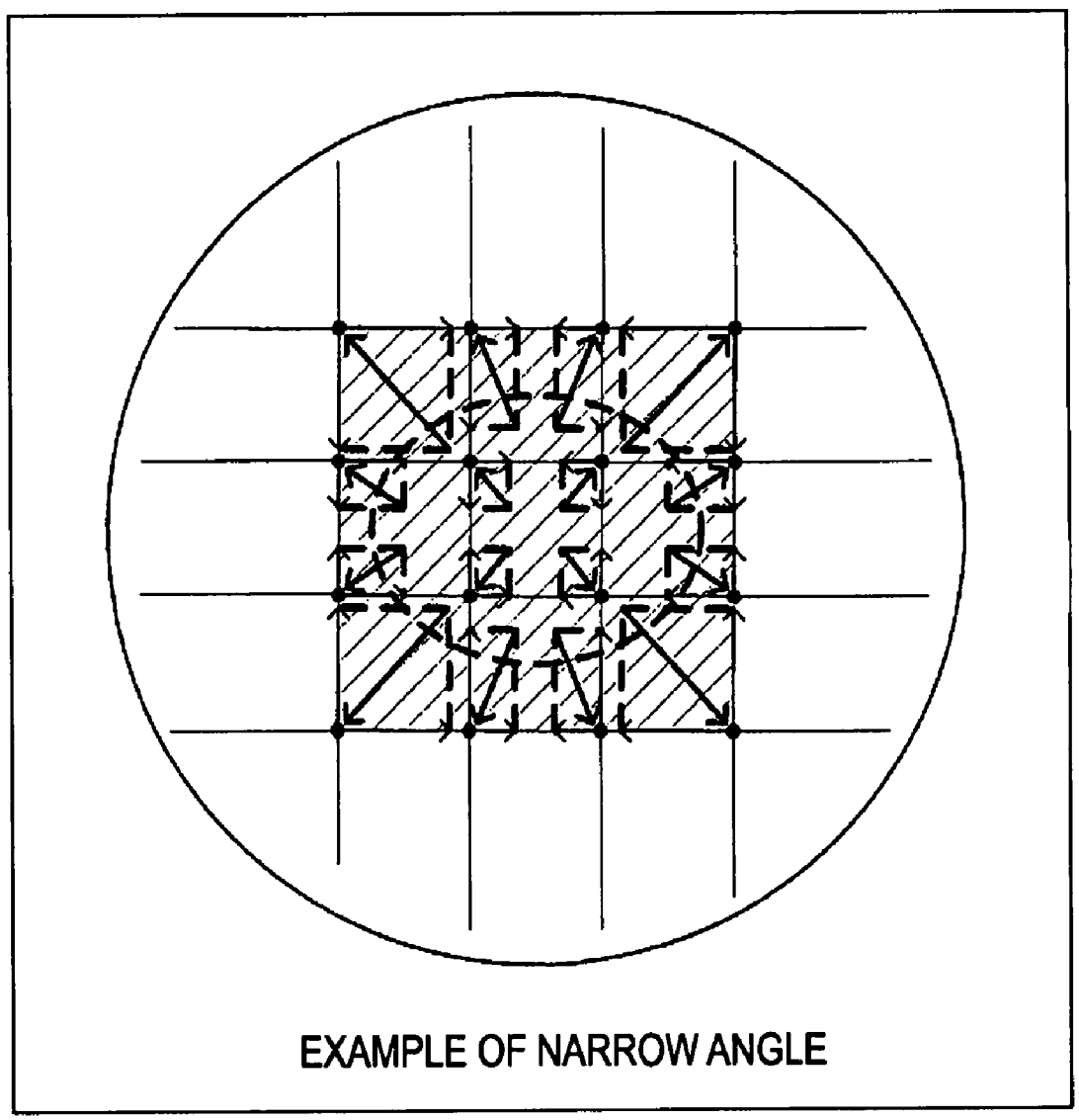
FIG. 5 is a diagram illustrating a first example of field-angle change.
Figure 6:
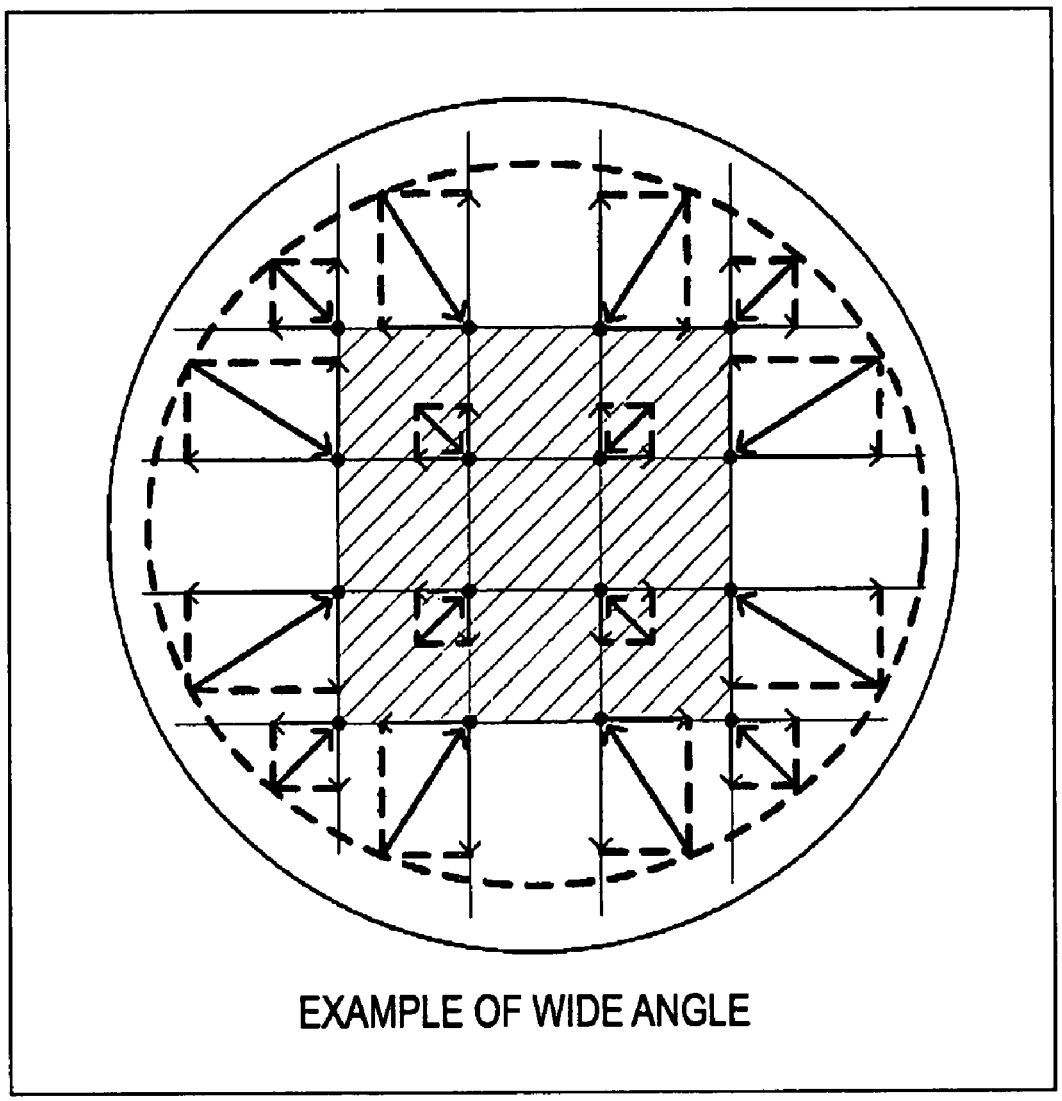
FIG. 6 is a diagram illustrating a second example of field-angle change.

When a field angle of a piece arbitrarily cut out from the source image is changed (zoom), in an arbitrary area of the source image shown in FIGS. 5 and 6, distortion correction parameters are obtained by adding offsets (X, Y) of lattice points of an output image to vectors (X, Y) of lattice points indicating the distortion aberration of the lens.

(1-3) Rotation of Piece Cut Out from Source Image

Figure 7:
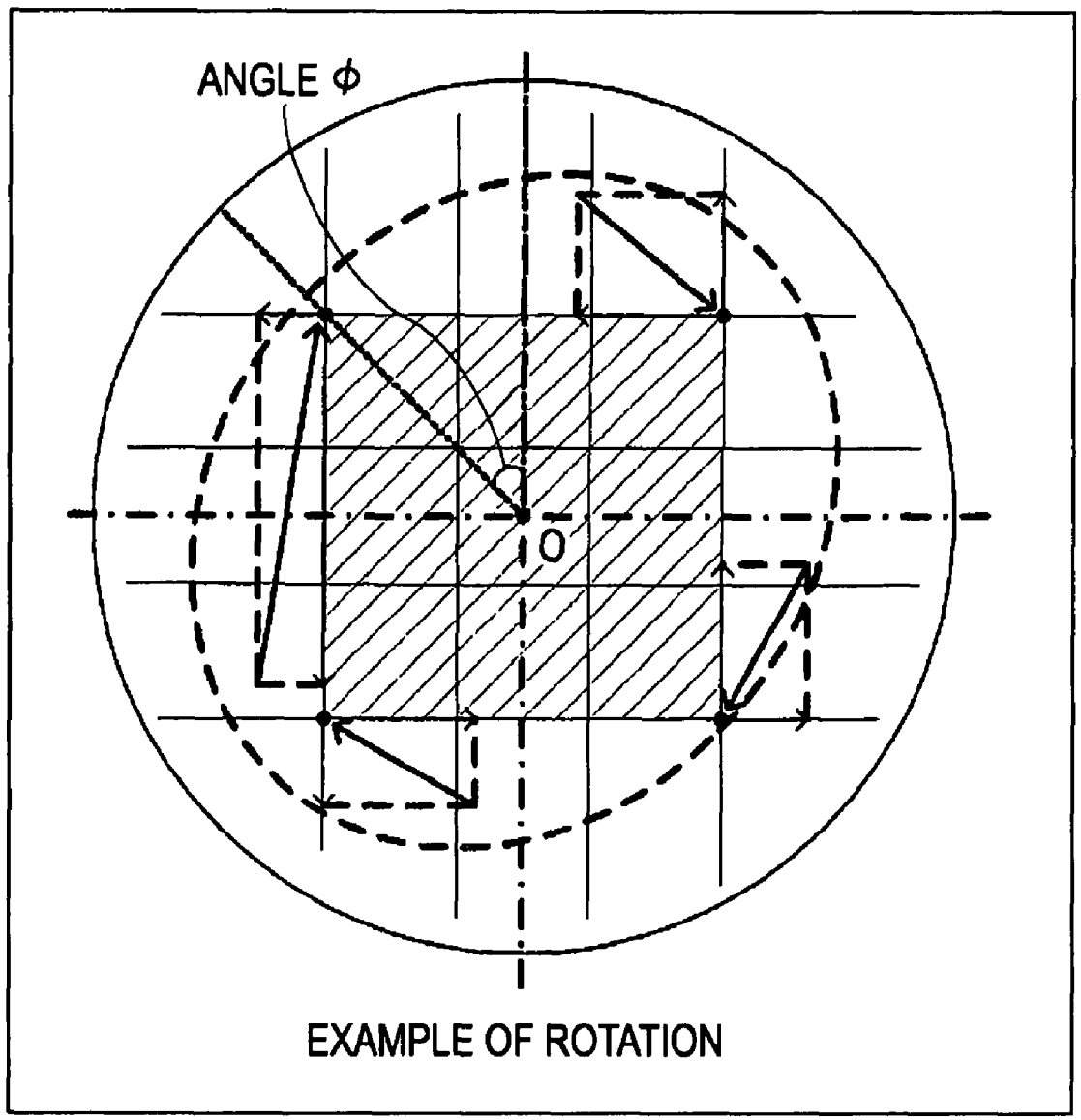
FIG. 7 is a diagram illustrating an example of rotation.

When a piece arbitrarily cut out from the source image is rotated, in an arbitrary area of the source image shown in FIG. 7, distortion correction parameters are obtained by adding offsets (X, Y) of lattice points of an output image to vectors (X, Y) of lattice points indicating the distortion aberration of the lens when the piece is rotated by angle φ with respect to the origin 0 of the source image as a center.

Figure 8:
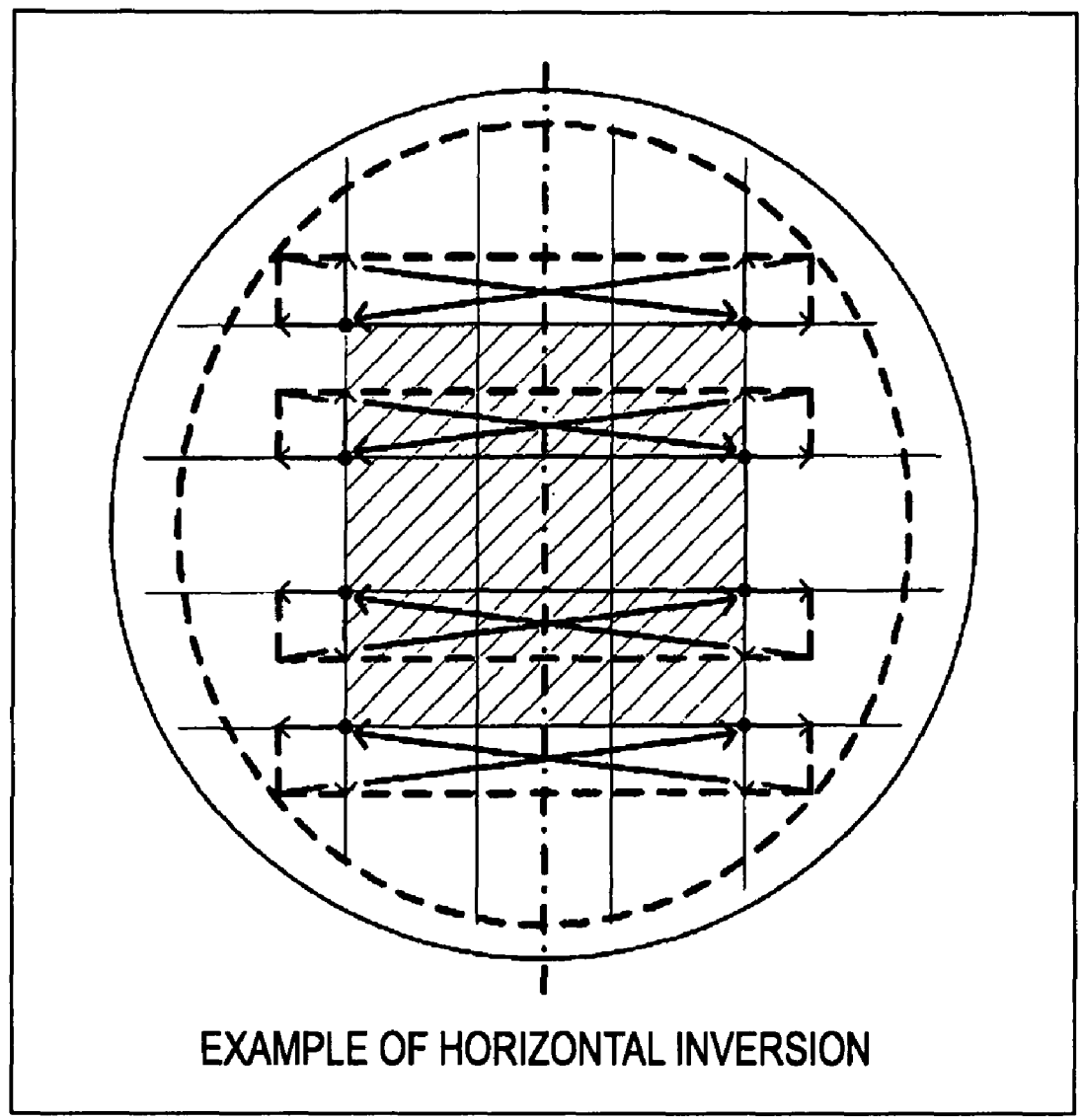
FIG. 8 is a diagram illustrating an example of horizontal inversion.

(1-4) Inversion Processing (Vertical/Horizontal Inversion) of Piece Cut Out from Source Image When a piece arbitrarily cut out from the source image is inverted (vertical/horizontal inversion), in an arbitrary portion or area of the source image shown in FIG. 8, the distortion correction parameters are obtained by adding offsets (X, Y) of lattice points of an output image to vectors (X, Y) of lattice points indicating the distortion aberration of the lens and further being moved to a symmetrically opposite position with respect to an arbitrary center (such as a vertical line, a horizontal line, a diagonal line, or the origin).

(1-5) Compositing of Pieces Cut Out from Source Image

Figure 9:
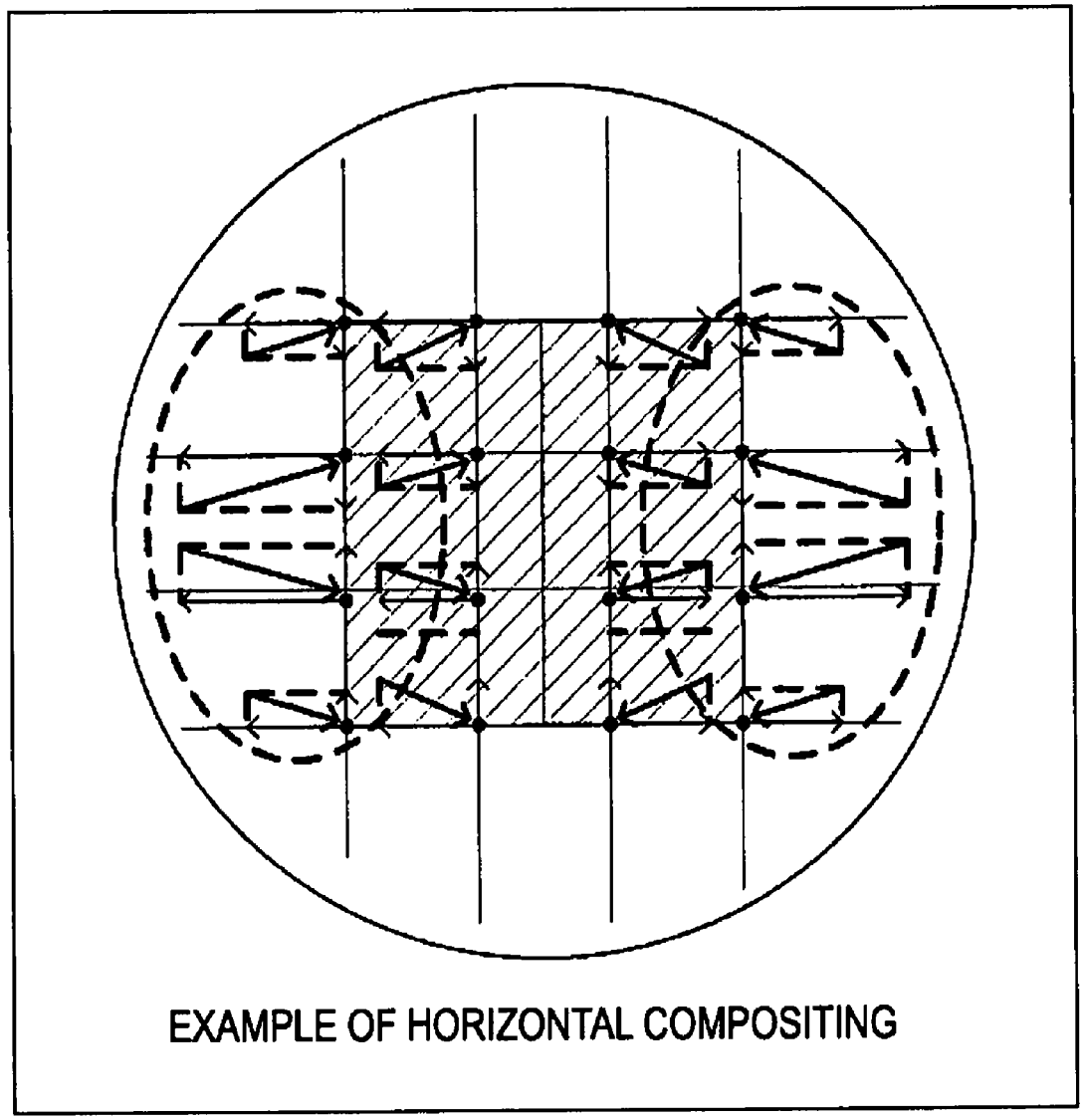
FIG. 9 is a diagram illustrating an example of horizontal compositing.

When pieces arbitrarily cut out from the source image are composited, in an arbitrary portion or area of the source image shown in FIG. 9, the distortion correction parameters are obtained by adding offsets (X, Y) of lattice points of an output image to vectors (X, Y) of lattice points indicating the distortion aberration of the lens and further compositing the cutout portions along an arbitrary parting line (such as a vertical line, a horizontal line, or a diagonal line).

In this case, the size of the output image is varied by changing the areas (large areas or small areas) of the cutout portions to be composited as the output image.

(1-6) No Distortion Correction on Source Image

When distortion correction is not performed on the source image, the vectors (X, Y) of the lattice points are set to "0" (zero), that is, the distortion aberration of the lens is not taken into consideration. Offsets (X, Y) of lattice points in an output image are added to zero to obtain parameters which are not subjected to the distortion correction. Note that any combination of the operations of (1-1) to (1-6) can be used.

Referring again to the configuration shown in FIG. 1, a method for transition by panning, tilting, zooming, or rotating a single image or all images constituting a composite image or arbitrary images constituting a composite image as an output image to an area other than its original area so as to be seen as a smooth change (movement) in the direction of the lens will now be described.

(2-1) Operation of Lens at Time of Transition in Distortion-Correction-Parameter Interpolation Processor 11

In FIG. 1, the second RAM 10 stores distortion correction parameters indicating a portion which is currently subjected to distortion correction (the portion is referred to as a "transition source" hereinafter). Before transition is started, the microcomputer 8 controls the first RAM 9 to store distortion correction parameters indicating a portion to be subjected to distortion correction (the portion is referred to as a "transition destination"). The microcomputer 8 further controls the distortion-correction-parameter interpolation processor 11 to start the transition. The distortion-correction-parameter interpolation processor 11 performs an interpolation so that the transition of vectors (X, Y) of lattice points of the distortion correction parameters (a transition source) stored in the second RAM 10 to vectors (X, Y) of lattice points of the distortion correction parameters (a transition destination) stored in the first RAM 9 is performed.

After the transition, contents of the first RAM 9 (the transition destination) are copied to the second RAM 10 (the transition source) and the copied contents indicate a portion which is currently subjected to distortion correction (the portion is a new transition source). Here, direct memory access (DMA) may be used for copying the contents of the first RAM 9 to the second RAM 10 or alternatively, RAM bank control may be used.

The operation of panning, tilting, or rotating is interrupted by temporarily stopping update of the distortion correction parameters currently used for the interpolation in the course of transition. Furthermore, the operation of panning, tilting, or rotating is stopped (terminated) by writing the distortion correction parameters generated by the interpolation processing back in the second RAM 10. The number of steps of transition (the number of times interpolation is performed) is arbitrarily selected. The larger the number of steps is, the slower the transition is, whereas the smaller the number of steps is, the faster the transition is.

In this case, the amount of time that one step of transition takes may correspond to an arbitrary cycle of a frame rate of a captured image or an output image or may correspond to an actual time. The transition may be controlled by the microcomputer 8 or using hardware (HW).

Figure 10:
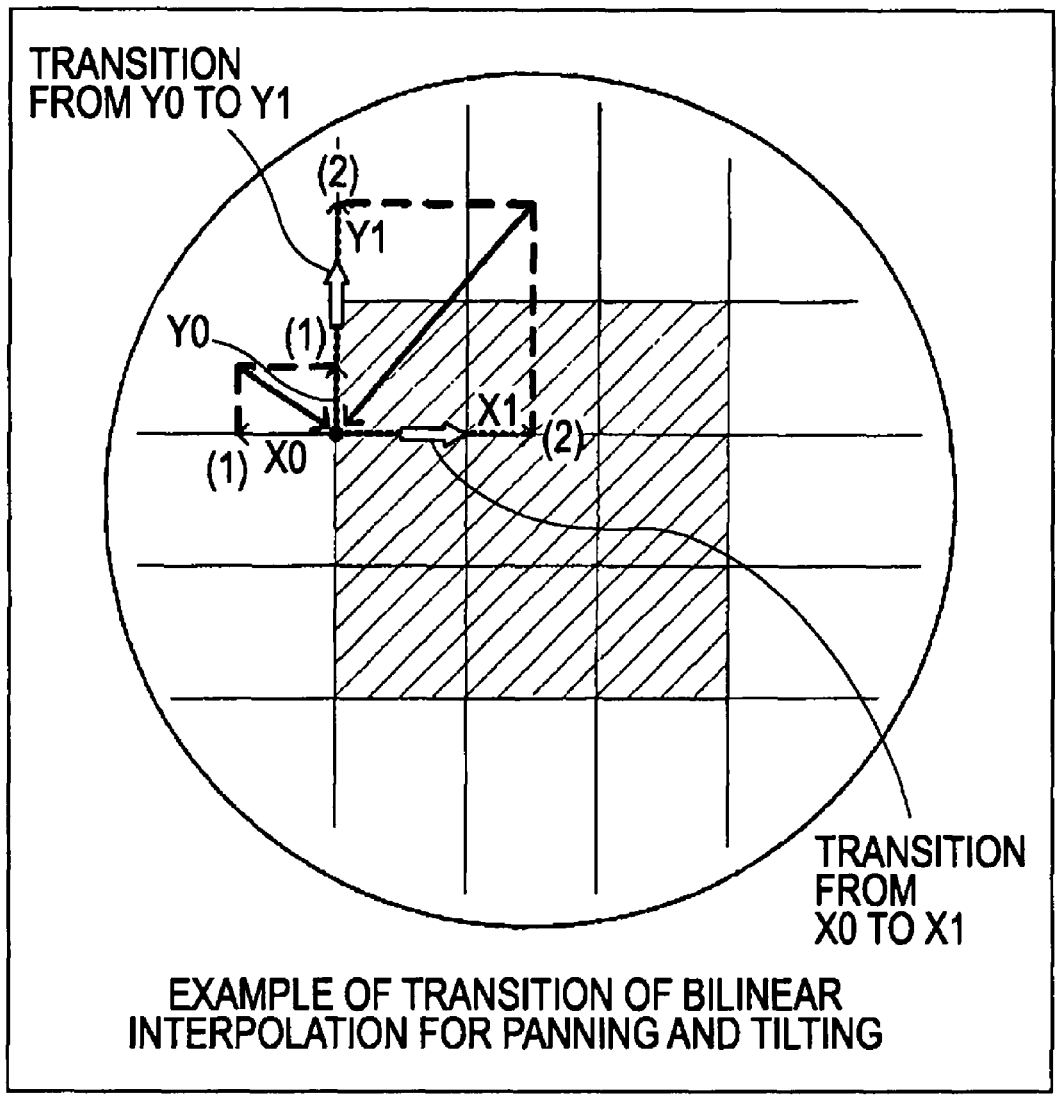
FIG. 10 is a diagram illustrating an example of transition of linear interpolation in panning and tilting.

(2-2) Interpolation at Time of Operation Other than Panning, Tilting, Zooming or Rotating When an operation other than panning, tilting, zooming, or rotating is performed, as shown in FIG. 10, bilinear interpolation including arbitrary steps of transition from vectors (X, Y) of lattice points of distortion correction parameters stored in the second RAM 10 (a transition source) to corresponding vectors (X, Y) of lattice points of distortion correction parameters stored in the first RAM 9 (a transition destination) is performed. In this case, if the vectors (X, Y) of the distortion correction parameters of the second RAM 10 are the same as the corresponding vectors (X, Y) of the distortion correction parameters of the first RAM 9, interpolation is not performed.

(2-3) Interpolation in Rotation

Figure 11:
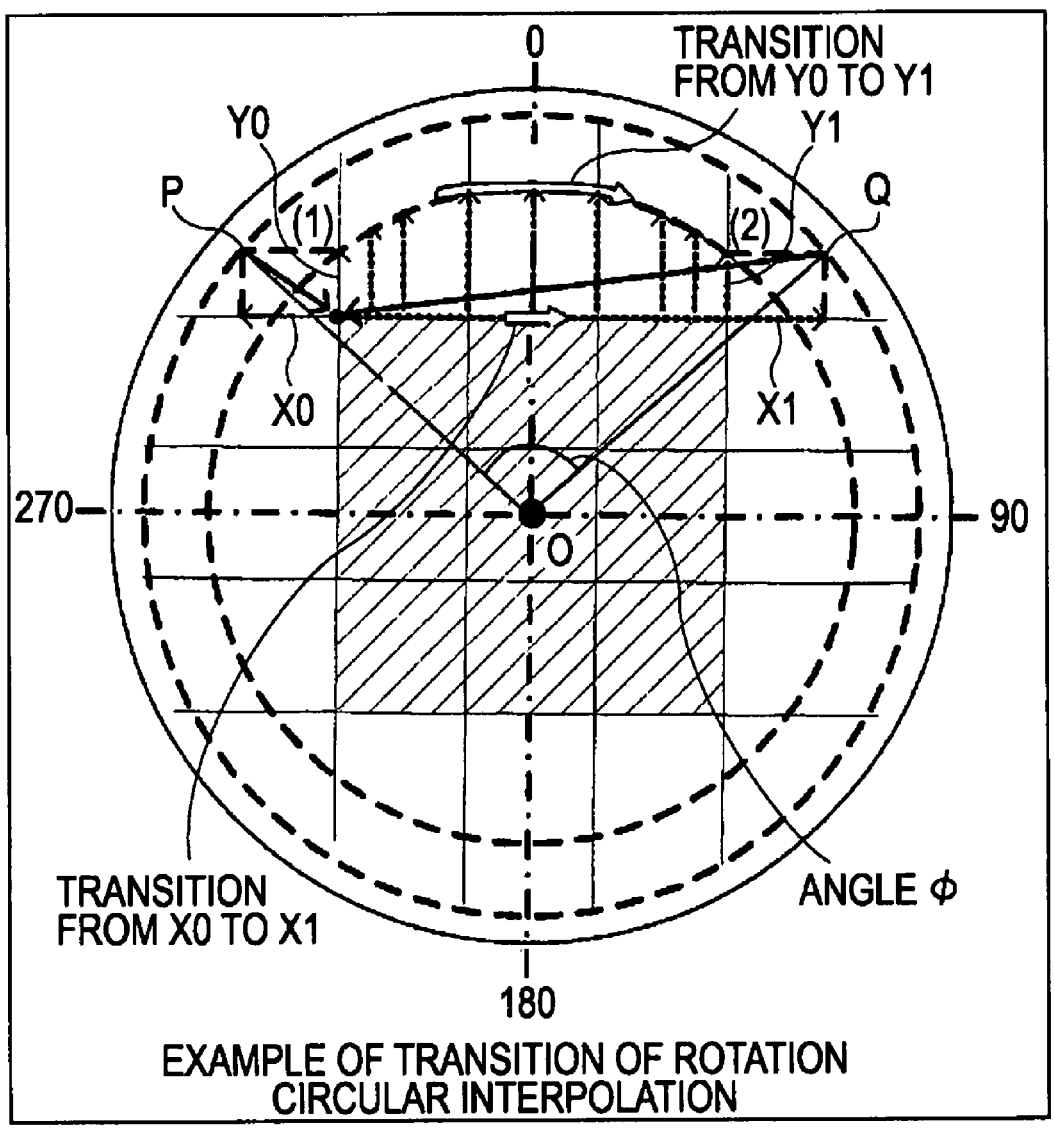
FIG. 11 is a diagram illustrating an example of transition of rotation circular interpolation.

When the image is rotated, as shown in FIG. 11, interpolation is performed such that vectors (X, Y) being subjected to interpolation by the arbitrary number of steps have a locus like an arc (hereinafter referred to as circular interpolation) of transition from vectors (X, Y) of lattice points of distortion correction parameters stored in the second RAM 10 (a transition source) to corresponding vectors (X, Y) of lattice points of distortion correction parameters stored in the first RAM 9 (a transition destination). In this case, if the vectors (X, Y) of the distortion correction parameters of the second RAM 10 are the same as the corresponding vectors (X, Y) of the distortion correction parameters of the first RAM 9, interpolation is not performed.

(2-4) Method for Circular Interpolation

Figure 12:
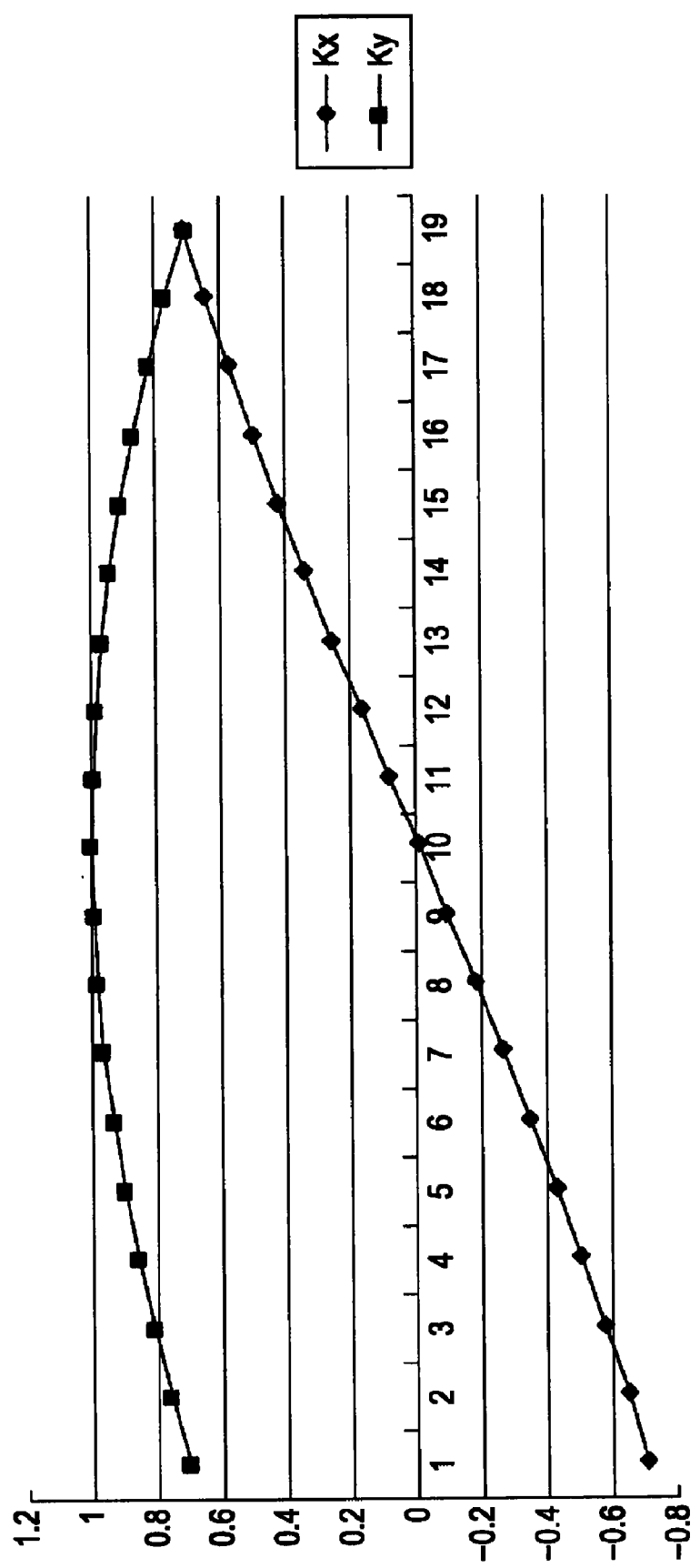
FIG. 12 is a diagram illustrating variation characteristics of Kx and Ky in the example of transition of rotation circular interpolation.

In the circular interpolation, the origin of the source image is set as a center and the sum of the components of each of a plurality of vectors (X, Y) corresponding to lattice points of a transition source and the sum of the components of each of a plurality of vectors (X, Y) corresponding to lattice points of a transition destination are obtained whereby an angle $\phi$ is obtained by an arctan, and a step angle $\theta$ is obtained by dividing the angle $\phi$ by the number of steps of transition. The angle $\theta$ is added to the angle $\phi$ of the lattice point of the transition source in every step and then a coefficient Kx, for which the origin 0 is set as the center, is obtained by a sine function and Ky, for which the origin 0 is set as the center, is obtained by a cosine function. Kx and Ky are multiplied by X and Y, respectively, whereby interpolation is completed. FIG. 12 is a diagram illustrating Kx and Ky in transition from a position of 315° to a position of 45° in a circle. The transition includes 18 steps.

Figure 13:
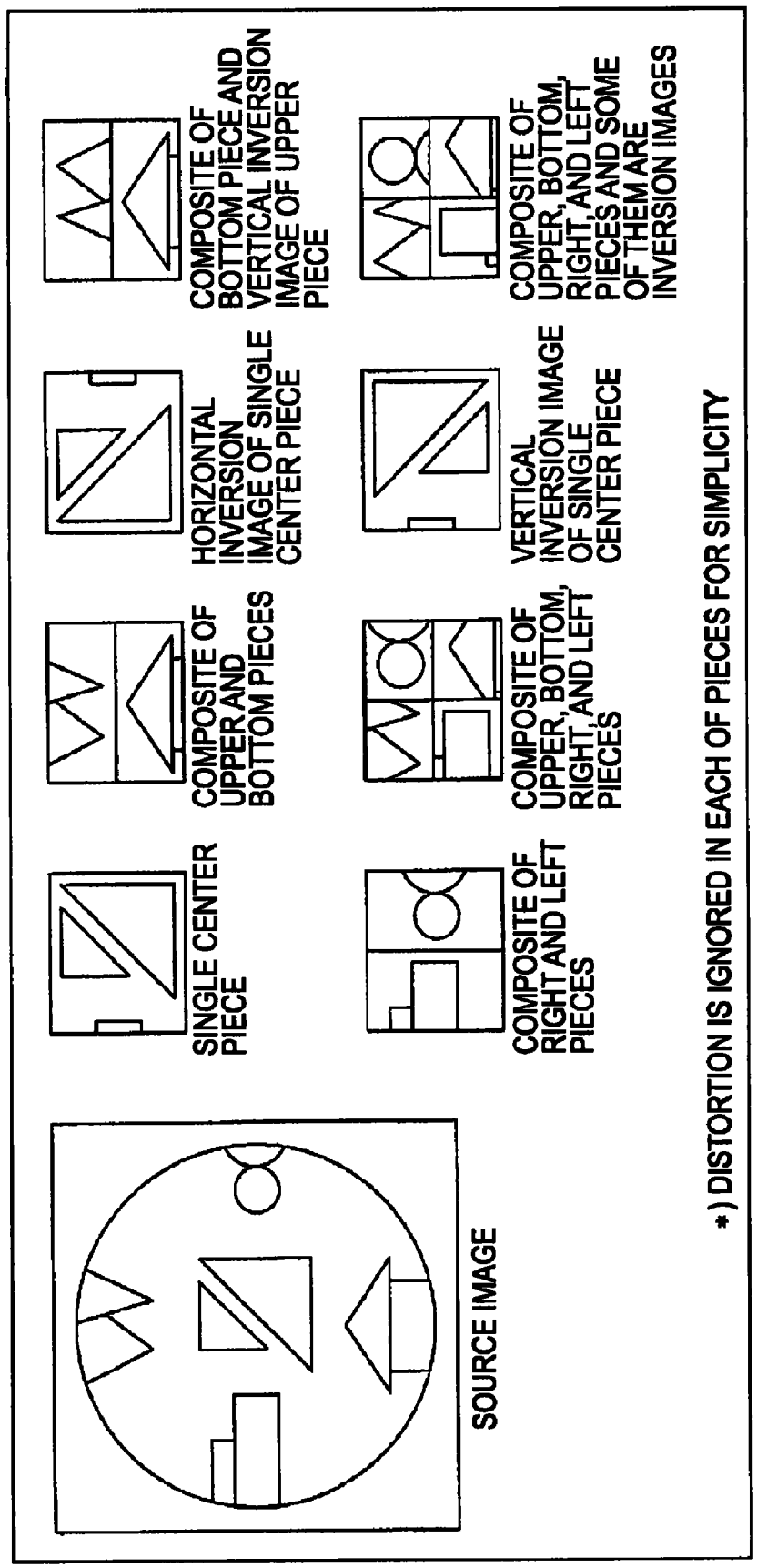
FIG. 13 is a diagram illustrating an example of compositing of cutout pieces by a plurality of methods.
Figure 14:
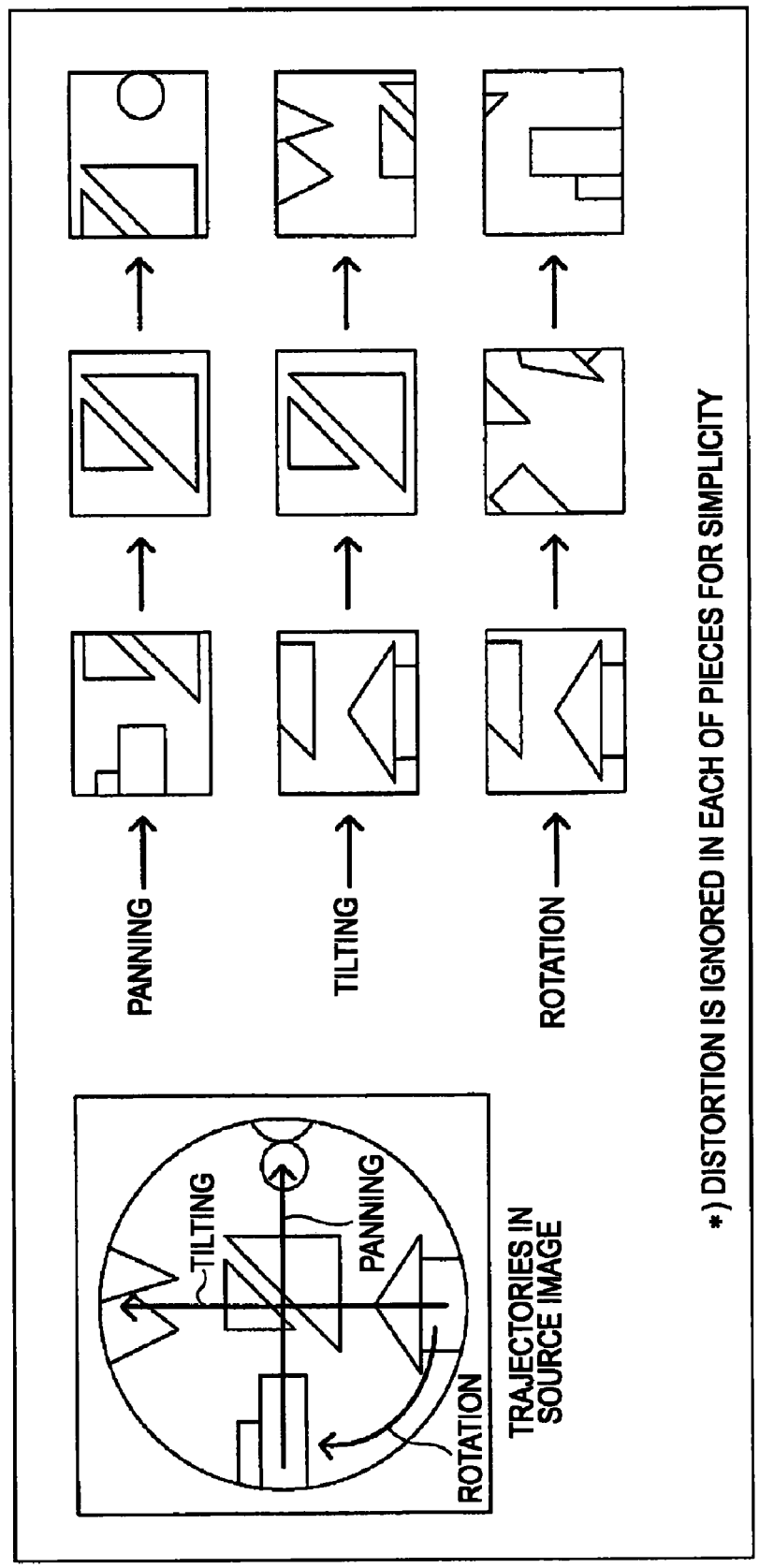
FIG. 14 is a diagram illustrating an example of transition in panning, tilting, and rotating.

Note that by using any combination of (1-1) to (1-5) and (2-1) to (2-4), arbitrary portions in the source image are cut out, the cutout portions are subjected to the inversion processing as needed and are composited as shown in FIG. 13, and the all of or a portion of the composite image can be selected for panning, tilting, zooming, or rotating as shown in FIG. 14.

A case where the camera device shown in FIG. 1 is externally controlled by the host computer, for example, connected thereto will now be described. A method for cutting out an image from the source image (panning and tilting), changing a field angle (zooming), rotating, inversion processing (vertical/horizontal inversion), and compositing performed in response to a simple instruction from the external interface (IF) will be described. In this case, the external IF may be used for communication with the host computer or may be a switch (a contact input).

(3-1) Case where External IF is Used for Communication with Host Computer

The host computer specifies "a panning angle, a tilting angle, a field angle, a rotation angle, inversion processing or no inversion processing, an output image size, and an output image location". When a plurality of images are intended to be composited, the host computer additionally specifies the necessity for compositing images.

(3-2) Case where External IF is Switch (Contact Input)

The host computer specifies arbitrary distortion correction parameters in accordance with the on/off state of a switch (a contact input). The on state and the off state of the switch (the contact input) may be used in combination for specifying the distortion correction parameters.

(3-3) Generation of Specified Distortion Correction Parameters

When the distortion correction parameters are specified as described in (3-1) and (3-2), the microcomputer 8 reads out the specified distortion correction parameters from a memory such as a ROM or a RAM. The distortion correction parameters read out may be modified by calculation performed by the microcomputer 8. Furthermore, some basic distortion correction parameters may be stored in the ROM or the RAM so that distortion correction parameters can be generated by combining the basic distortion correction parameters. Alternatively, distortion correction parameters may be generated by calculation performed by the microcomputer 8 instead of the distortion correction parameters stored in the ROM or the RAM.

(3-4) Update of Distortion Correction Parameters

The microcomputer 8 writes the distortion correction parameters obtained in (3-3) to the first RAM 9 and controls the distortion-correction-parameter interpolation processor 11 to start transition, whereby distortion correction, cutout processing, rotating, inversion processing, and compositing are performed. The transition may be interrupted or may be stopped (terminated) in accordance with an instruction from the external IF.

Figure 15:
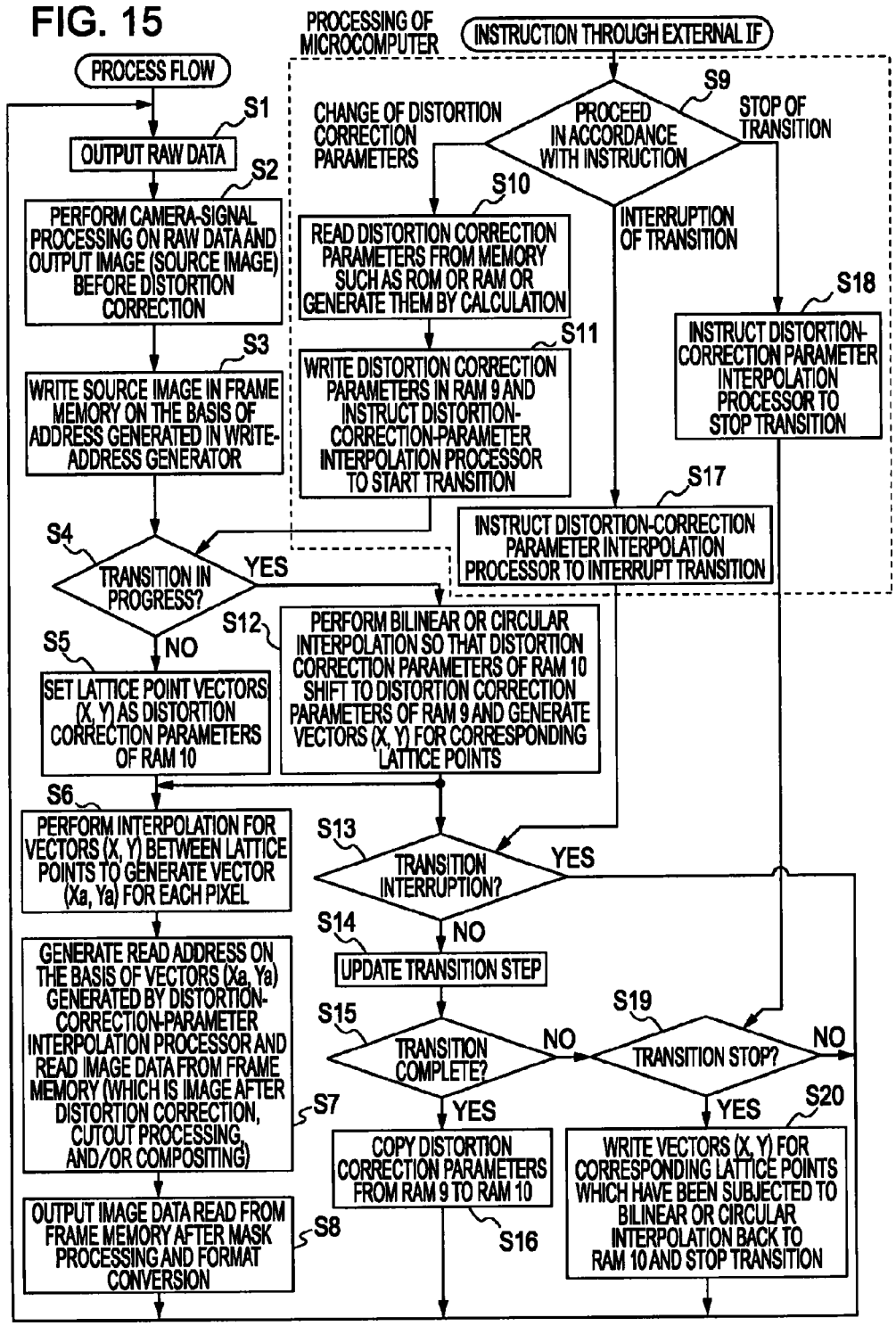
FIG. 15 is a flowchart illustrating an operation procedure of the camera device shown in FIG. 1.

FIG. 15 is a flowchart illustrating an operation procedure of the camera device shown in FIG. 1. Starting with step S1, RAW data is output from the imaging sensor 2. In step S2, the RAW data is subjected to camera-signal processing in the camera-signal processor 3 and an image to which distortion correction has not yet been applied (a source image) is output to the frame memory 4. In step S3, the source image is written in the frame memory 4 on the basis of an address generated in the write-address generator 5.

In step S4, the distortion-correction-parameter interpolation processor 11 determines whether transition from distortion correction parameters of the first RAM 9 to distortion correction parameters of the second RAM 10 is in progress in accordance with an instruction for starting the transition from an external IF, for example. If the determination is negative, the flow proceeds to step S5, whereas if the determination is affirmative, the flow proceeds to step S12.

In step S5, the distortion-correction-parameter interpolation processor 11 sets distortion correction parameters of the second RAM 10 as vectors (X, Y) of the lattice points. In step S6, the distortion-correction-parameter interpolation processor 11 performs interpolation for the vectors (X, Y) with respect to the distortion correction parameters between the lattice points to generate vectors (Xa, Ya) for corresponding pixels. In step S7, the read-address converter 6 generates read addresses on the basis of the vectors (Xa, Ya) generated by the distortion-correction-parameter interpolation processor 11 and reads out image data from the frame memory 4 (which is an image obtained after distortion correction, cutout processing, and/or compositing). In step S8, the output processor 7 outputs image data read from the frame memory through a transmission line to an external apparatus such as a host computer after mask processing and format conversion, and the flow returns to step S1.

On the other hand, when it is determined that the transition is in progress in step S4, the flow proceeds to step S12 where the distortion-correction-parameter interpolation processor 11 performs bilinear or circular interpolation so that transition from the distortion correction parameters of the second RAM 10 to the distortion correction parameters of the first RAM 9 is performed in every step of the transition to generate vectors (X, Y) for corresponding lattice points. In step S13, the distortion-correction-parameter interpolation processor 11 determines whether the transition is interrupted in response to an instruction through the external IF which will be described later. When the determination is affirmative, the flow returns to step S1. When the determination is negative, the flow proceeds to step S14 where the distortion-correction-parameter interpolation processor 11 updates the transition step. In step S15, the distortion-correction-parameter interpolation processor 11 determines whether the transition is completed. When the determination is affirmative, the flow proceeds to step S16 where the distortion-correction-parameter interpolation processor 11 copies the distortion correction parameters from the first RAM 9 to the second RAM 10. When the determination is negative, the flow proceeds to step S19 where the distortion-correction-parameter interpolation processor 11 determines whether an instruction to stop the transition is transmitted from the external IF, for example. When the determination is negative, the flow returns to step S1. When the determination is affirmative, the flow proceeds to step S20 where the distortion-correction-parameter interpolation processor 11 writes vectors (X, Y) for corresponding lattice points which have been subjected to bilinear or circular interpolation back in the second RAM 10 and stops the transition.

A case where an instruction is transmitted through the external interface will now be described. In step S9, when an instruction is transmitted through the external interface, the microcomputer 8 selects the next processing in accordance with the contents of the instruction. When the instruction indicates a change in the distortion correction parameters in step S9, the flow proceeds to step S10 where the microcomputer 8 reads out arbitrary distortion correction parameters from the memory such as a ROM or a RAM or alternatively, generates arbitrary distortion correction parameters by calculation performed by the microcomputer 8. In step S11, the microcomputer 8 writes the arbitrary distortion correction parameters to the first RAM 9 and instructs the distortion-correction-parameter interpolation processor 11 to start transition.

When the instruction indicates the interruption of the transition in step S9, the flow proceeds to step S17 where the microcomputer 8 instructs the distortion-correction-parameter interpolation processor 11 to interrupt the transition. When the instruction indicates the stop of the transition in step S9, the flow proceeds to step S18 where the microcomputer 8 instructs the distortion-correction-parameter interpolation processor 11 to stop the transition.

According to this embodiment, since a camera device performs distortion correction for an image captured by the super-wide-angle lens 1, the host computer to which the camera device is connected through a line, for example, merely have standard performance. Accordingly, use of such a host computer does not lead to an excessive increase in the cost of the monitoring system. In the camera device, the microcomputer 8 merely indicates distortion correction parameters for a source image and distortion correction parameters for a final image to be obtained. The distortion-correction-parameter interpolation processor 11 generates other necessary distortion correction parameters to perform distortion correction on an image. Accordingly, a smooth display of the image is achieved at the time of panning, tilting, zooming or rotating. Since the microcomputer 8 does not have many distortion correction parameters, a large-capacity storage apparatus or a high-performance central processing unit (CPU) is not necessary. Accordingly, use of such a microcomputer 8 does not lead to an increase in the cost of the monitoring system.

According to this embodiment, since the camera device itself performs image processing such as distortion correction, cutout processing, inversion processing, or compositing, the following advantage can be obtained. That is, when compared with a case where an external host computer performs image processing such as distortion correction, cutout processing, and compositing on an image captured by a camera device using software, the load on the host computer is considerably reduced resulting in improvement of real-time processing (a frame rate is improved). This further leads to improvement in image quality.

Since the distortion correction is performed using the distortion correction parameters and furthermore the distortion correction parameters are generated by means of interpolation, operations of panning, tilting, zooming, and rotating are easily achieved, and thus a mechanical drive is not necessary. Any extra image processing is achieved with ease using, for example, inversion processing, or compositing, or a combination thereof. In addition, smooth panning, tilting, zooming, or rotating is achieved and the lens can be stopped at a desired position. Furthermore, smooth panning, tilting, zooming, or rotating can be performed again from the stopped position, and thus the operation can be visually performed with ease.

Since a simple instruction for panning, tilting, zooming, rotating, or compositing can be transmitted through an external IF, the system cost can be reduced.

Since the image processing such as distortion correction, cutout processing, or compositing is performed inside the camera device, dynamic range is improved. Since the imaging sensor 2 having a total number of pixels larger than the number of output pixels is used, deterioration of resolution in a peripheral area due to distortion aberration characteristics of the lens can be suppressed. Even when an analog transmitter (such as a transmitter using NTSC) is used, distortion correction, cutout processing, and compositing are performed in the camera device before transmission, and thus signal-to-noise (S/N) ratio can be improved (an image larger than the source image can be transmitted).

Since the arbitrary distortion correction parameters are stored in the memory in the camera device or are obtained by calculation performed by the microcomputer 8, a lens having a different field angle or a lens having different distortion aberration may be used with no problems.

With this configuration, a smooth operation of zooming from a current field angle to another field angle is achieved similarly to a smooth operation of zooming by means of a mechanical drive. In addition, a smooth operation of rotating from a current rotation angle to another rotation angle is achieved similarly to a smooth operation of rotating by means of a mechanical drive.

Furthermore, smooth transition from a current image to a mirror inversion image is achieved. A smooth operation of panning/tilting from a current cutout portion to another cutout portion is achieved similarly to a smooth operation of panning/tilting by means of a mechanical drive.

Moreover, a smooth operation of zooming from a current field angle to another field angle is achieved similarly to a smooth operation of zooming by means of a mechanical drive. In addition, a smooth operation of rotating from a current cutout portion to another cutout portion is achieved similarly to a smooth operation of rotating by means of a mechanical drive.

Furthermore, smooth transition from a current image to a mirror inversion image is achieved.

Smooth transition from a current image size to another image size is achieved.

Smooth relocation from a current position to another position is achieved. Processing may be performed only on an arbitrary cutout portion.

Smooth transition from an image to which distortion correction has been applied to an image to which distortion correction has not yet been applied and vice versa is achieved. Speed (an amount of time) for the smooth transition may be arbitrarily set.

When the amount of time for the transition is set to minimum, an image shifts to an image in a desired state immediately. The smooth transition may be interrupted.

The smooth transition may be stopped (terminated) and the stopped transition may be started again.

The present invention is not limited to the above-described embodiment and may be embodied by various modifications in terms of a detailed configuration, function, operation, and advantages without departing from the scope of the invention.

What is claimed is:

1. A camera device having a function for converting an image formed by a lens and captured by an imaging element into image data and correcting distortion of the image data caused by distortion aberration of the lens, the camera device comprising:

first storage means for storing first distortion correction parameters for correcting the distortion of the image data in a first state caused by the distortion aberration of the lens;

second storage means for storing second distortion correction parameters for correcting the distortion of the image data in a second state caused by the distortion aberration of the lens; and distortion-correction-parameter interpolation means for generating distortion correction parameters through interpolation when transition of the image data from the first state to the second state is performed, the distortion correction parameters indicating states of the image data during the transition of the image data and correcting the distortion of the image data caused by the distortion aberration of the lens, wherein when circular interpolation is performed using the distortion correction parameters, the distortion-correction-parameter interpolation means sets the origin of the image data as a center, a sum of components of each of a plurality of vectors (X, Y) corresponding to lattice points of a transition source and a sum of components of each of a plurality of vectors (X, Y) corresponding to lattice points of a transition destination are obtained whereby an angle $\phi$ is obtained by an arctan, the plurality of vectors (X, Y) indicating the distortion correction parameters, a step angle ⊖ is obtained by dividing the angle φ by the number of steps of transition, the angle ⊖ is added to the angle φ of each of the lattice point of the transition source in every step, a coefficient Kx, for which the origin 0 is set as the center, is obtained by a sine function and Ky, for which the origin 0 is set as the center, is obtained by a cosine function, and the Kx and Ky are multiplied by X and Y, respectively, whereby interpolation is completed.

2. The camera device according to claim 1, wherein the total number of pixels receiving light of the imaging element is larger than the total number of pixels of an image output from the camera device after the distortion correction.

3. The camera device according to claim 1, wherein the lens is a super-wide-angle lens.

4. The camera device according to claim 1, wherein a direction of the lens is fixed.

5. The camera device according to claim 1, wherein the distortion-correction-parameter interpolation means includes hardware.

6. The camera device according to claim 1, wherein the distortion correction parameters for correcting the distortion of the image data in the first state and the distortion of the image data in the second state are stored in advance in a storage device in control means for reading/writing the distortion correction parameters from/to the first storage means and the second storage means, are obtained by calculation using the control means, or are obtained from an external device communicating with the camera device.

7. The camera device according to claim 1, wherein the transition of the image data from the first state to the second state is performed by changing a field angle of the image data, rotating the image data, inversion processing of the image data, or a combination thereof and furthermore the transition is performed by cutout processing of an arbitrary portion of the image data, changing of a field angle of the arbitrary portion of the image data, cutout processing of an arbitrary portion by rotation setting an arbitrary base point in the image data as a center, inversion processing of the arbitrary portion of the image data, and a combination thereof, and moreover the transition is performed by changing a size of the arbitrary portion of the image data, or moving the image data to an arbitrary position.

8. A monitoring system for transmitting an image captured by one or more monitoring cameras having a super-wide-angle lens through a transmission line to a host computer, the monitoring system comprising:
distortion correction means for correcting distortion of image data caused by distortion aberration of the lens, the image data being obtained by being formed by the super-wide-angle lens and being captured by an imaging element, the distortion correction means being included in the one or more monitoring cameras;
wherein the distortion correction means includes,
first storage means for storing first distortion correction parameters for correcting the distortion of the image data in a first state caused by the distortion aberration of the lens,
second storage means for storing second distortion correction parameters for correcting the distortion of the image data in a second state caused by the distortion aberration of the lens, and
distortion-correction-parameter interpolation means for generating distortion correction parameters through interpolation when transition of the image data from the first state to the second state is performed, the distortion correction parameters indicating states of the image data during the transition of the image data and correcting the distortion of the image data caused by the distortion aberration of the lens,
wherein when circular interpolation is performed using the distortion correction parameters, the distortion-correction-parameter interpolation means sets the origin of the image data as a center, a sum of components of each of a plurality of vectors (X, Y) corresponding to lattice points of a transition source and a sum of components of each of a plurality of vectors (X, Y) corresponding to lattice points of a transition destination are obtained whereby an angle φ is obtained by an arctan, the plurality of vectors (X, Y) indicating the distortion correction parameters, a step angle ⊖ is obtained by dividing the angle φ by the number of steps of transition, the angle ⊖ is added to the angle φ of each of the lattice point of the transition source in every step, a coefficient Kx, for which the origin 0 is set as the center, is obtained by a sine function and Ky, for which the origin 0 is set as the center, is obtained by a cosine function, and the Kx and Ky are multiplied by X and Y, respectively, whereby interpolation is completed.

9. The monitoring system according to claim 8, wherein the total number of pixels receiving light of the imaging element of the one or more monitoring cameras is larger than the total number of pixels of an image output from the one or more monitoring cameras after the distortion correction.

10. A camera device having a function for converting an image formed by a lens and captured by an imaging element into image data and correcting distortion of the image data caused by distortion aberration of the lens, the camera device comprising:
a first storage unit configured to store first distortion correction parameters for correcting the distortion of the image data in a first state caused by the distortion aberration of the lens;
a second storage unit configured to store second distortion correction parameters for correcting the distortion of the image data in a second state caused by the distortion aberration of the lens; and
a distortion-correction-parameter interpolator configured to generate distortion correction parameters through interpolation when transition of the image data from the first state to the second state is performed, the distortion correction parameters indicating states of the image data during the transition of the image data and correcting the distortion of the image data caused by the distortion aberration of the lens,
wherein when circular interpolation is performed using the distortion correction parameters, the distortion-correction-parameter interpolation means sets the origin of the image data as a center, a sum of components of each of a plurality of vectors (X, Y) corresponding to lattice points of a transition source and a sum of components of each of a plurality of vectors (X, Y) corresponding to lattice points of a transition destination are obtained whereby an angle φ is obtained by an arctan, the plurality of vectors (X, Y) indicating the distortion correction parameters, a step angle ⊖ is obtained by dividing the angle φ by the number of steps of transition, the angle ⊖ is added to the angle φ of each of the lattice point of the transition source in every step, a coefficient Kx, for which the origin 0 is set as the center, is obtained by a sine function and Ky, for which the origin 0 is set as the center, is obtained by a cosine function, and the Kx and Ky are multiplied by X and Y, respectively, whereby interpolation is completed.

11. A monitoring system for transmitting an image captured by one or more monitoring cameras having a super-wide-angle lens through a transmission line to a host computer, the monitoring system comprising:

a distortion corrector configured to correct distortion of image data caused by distortion aberration of the lens, the image data being obtained by being formed by the super-wide-angle lens and being captured by an imaging element, the distortion corrector being included in the one or more monitoring cameras;

wherein the distortion corrector includes, a first storage unit configured to store first distortion correction parameters for correcting the distortion of the image data in a first state caused by the distortion aberration of the lens, a second storage unit configured to store second distortion correction parameters for correcting the distortion of the image data in a second state caused by the distortion aberration of the lens, and a distortion-correction-parameter interpolator configured to generate distortion correction parameters through interpolation when transition of the image data from the first state to the second state is performed, the distortion correction parameters indicating states of the image data during the transition of the image data and correcting the distortion of the image data caused by the distortion aberration of the lens, wherein when circular interpolation is performed using the distortion correction parameters, the distortion-correction-parameter interpolation means sets the origin of the image data as a center, a sum of components of each of a plurality of vectors (X, Y) corresponding to lattice points of a transition source and a sum of components of each of a plurality of vectors (X, Y) corresponding to lattice points of a transition destination are obtained whereby an angle $\phi$ is obtained by an arctan, the plurality of vectors (X, Y) indicating the distortion correction parameters, a step angle $\ominus$ is obtained by dividing the angle $\phi$ by the number of steps of transition, the angle $\ominus$ is added to the angle $\phi$ of each of the lattice point of the transition source in every step, a coefficient Kx, for which the origin 0 is set as the center, is obtained by a sine function and Ky, for which the origin 0 is set as the center, is obtained by a cosine function, and the Kx and Ky are multiplied by X and Y, respectively, whereby interpolation is completed.

* * * * *